United States Patent
Zohar et al.

(10) Patent No.: US 7,653,800 B2
(45) Date of Patent: Jan. 26, 2010

(54) CONTINUOUS DATA PROTECTION

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shemer Schwartz, Herzelia (IL)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 11/196,721

(22) Filed: Aug. 3, 2005

(65) Prior Publication Data

US 2007/0033370 A1    Feb. 8, 2007

(51) Int. Cl.
    G06F 13/16    (2006.01)
(52) U.S. Cl. ...................................... 711/173
(58) Field of Classification Search ................. 711/173
    See application file for complete search history.

(56) References Cited

U.S. PATENT DOCUMENTS

| | | | | |
|---|---|---|---|---|
| 5,347,653 A * | 9/1994 | Flynn et al. | ................. | 707/203 |
| 5,604,862 A * | 2/1997 | Midgely et al. | ................. | 714/6 |
| 2003/0083049 A1* | 5/2003 | Matthews | ................... | 455/414 |
| 2005/0063374 A1 | 3/2005 | Rowan et al. | | |
| 2005/0065962 A1 | 3/2005 | Rowan et al. | | |
| 2005/0066222 A1 | 3/2005 | Rowan et al. | | |
| 2005/0076261 A1 | 4/2005 | Rowan et al. | | |
| 2005/0076262 A1 | 4/2005 | Rowan et al. | | |

OTHER PUBLICATIONS

Aho, Alfred V. et al., "Data Structures and Algorithms", 1983, Addison-Wesley, p. 122.*
Danesh, Arman, "Mastering Linux", 1999, Sybex, p. 72.*
Hwang, Kai, "Advanced Computer Architecture: Parallelism, Scalability, Programmability", 1993, McGraw-Hill, p. 221.*
"Microsoft Computer Dictionary", 2002, Microsoft Press, Fifth Edition, p. 61.*

* cited by examiner

*Primary Examiner*—Sanjiv Shah
*Assistant Examiner*—Shawn Eland
(74) *Attorney, Agent, or Firm*—Griffiths & Seaton PLLC

(57) ABSTRACT

A method for continuous data protection in a storage system, including receiving a first write command to write first data to a partition of a logical volume and then generating a first partition descriptor record (PDR) having a first timestamp. The method further includes storing the first data at a first location, associating the first PDR with the first location, and receiving a second write command, subsequent to the first command, to update the first data with second data. Responsively to the second command, a second PDR having a second timestamp is generated. The second data is stored at a second location, and the second PDR is associated with the second location. The method includes generating a pointer between the first PDR and the second PDR, and accessing the first PDR using the pointer in response to a read command indicating a time prior to the second timestamp.

7 Claims, 10 Drawing Sheets

PARTITION DESCRIPTOR RECORDS

| | ADDRESS (70) | PRIOR LINK (72) | FORWARD LINK (74) | VOLUME (76) | PARTITION (78) | BITMAP (80) | TIMESTAMP (82) | PHYSICAL ADDRESS (84) |
|---|---|---|---|---|---|---|---|---|
| SET 1 { 52 | P00101 | | | V5 | P3 | | H00043902 | PHYYY01 |
| SET 1 { 54 | P00102 | | | V5 | P5 | | H00087826 | PHYYY02 |
| SET 2 { 56 | P00101 | | P00103 | V5 | P3 | | H00043902 | PHYYY01 |
| SET 2 { 58 | P00103 | P00101 | | V5 | P3 | | H00089887 | PHYYY03 |
| SET 3 { 60 | P00103 | P00101 | P00104 | V5 | P3 | | H00089887 | PHYYY03 |
| SET 3 { 62 | P00104 | P00103 | | V5 | P3 | | H00090032 | PHYYY04 |

FIG. 3

PARTITION DESCRIPTOR RECORDS

| | ADDRESS 70 | PRIOR LINK 72 | FORWARD LINK 74 | VOLUME 76 | PARTITION 78 | BITMAP 80 | TIMESTAMP 82 | PHYSICAL ADDRESS 84 |
|---|---|---|---|---|---|---|---|---|
| SET 1 { 52 | P00101 | | | V5 | P3 | | H00043902 | PHYYY01 |
| SET 1 { 54 | P00102 | | | V5 | P5 | | H00087826 | PHYYY02 |
| SET 2 { 56 | P00101 | | P00103 | V5 | P3 | | H00043902 | PHYYY01 |
| SET 2 { 58 | P00103 | P00101 | | V5 | P3 | | H00089887 | PHYYY03 |
| SET 3 { 60 | P00103 | P00101 | P00104 | V5 | P3 | | H00089887 | PHYYY03 |
| SET 3 { 62 | P00104 | P00103 | | V5 | P3 | | H00090032 | PHYYY04 |

FIG. 9

PARTITION DESCRIPTOR RECORDS 40

| ADDRESS 70 | LEFT LINK 292 | RIGHT LINK 294 | PARENT LINK 296 | PARTITION 76 | VOLUME 78 | BITMAP 80 | TIMESTAMP 82 | PHYSICAL ADDRESS 84 |
|---|---|---|---|---|---|---|---|---|
| P00001 |  |  | P00002 | P3 | V6 |  | H00003902 | PHYYY01 |
| P00002 | P00001 | P00003 | P00004 | P3 | V6 |  | H00005904 | PHYYY02 |
| P00003 |  |  | P00002 | P3 | V6 |  | H00011034 | PHYYY03 |
| P00004 | P00002 | P00006 | P00008 | P3 | V6 |  | H00013802 | PHYYY04 |
| P00005 |  |  | P00006 | P3 | V6 |  | H00028938 | PHYYY05 |
| P00006 | P00005 | P00007 | P00004 | P3 | V6 |  | H00029034 | PHYYY06 |
| P00007 |  |  | P00006 | P3 | V6 |  | H00040392 | PHYYY07 |
| P00008 |  | P00004 |  | P3 | V6 |  | H00042790 | PHYYY08 |

CONTINUOUS DATA PROTECTION

FIELD OF THE INVENTION

The present invention relates generally to methods and apparatus for data storage. More particularly, the present invention relates to methods and apparatus for maintaining data associated with timestamps in data storage systems.

BACKGROUND OF THE INVENTION

Data storage systems generally store data on physical media in a manner that is transparent to host computers. From the perspective of a host computer, data is stored at logical addresses located on file systems, or logical volumes, of the storage system. The file systems or logical volumes are typically configured to store the data required for a specific data processing application. To function, data storage systems map the logical addresses to addressable physical locations on storage media, such as direct access hard disks. In a typical configuration, physical locations comprise tracks on a hard disk, and a track can typically store many blocks of data.

Continuous Data Protection (CDP) is a term used to indicate techniques for restoring data sets, such as logical volumes, to a situation existing at a prior instant of time. When a system utilizes CDP, a system administrator does not have to initiate the process of copying logical volumes so as to be able to recover the status at a prior time. Rather, the system creates copies automatically, and the administrator may access the copies by specifying the desired prior time for data restoration.

U.S. Patent Application Publications 2005/0076262, 2005/0076261, 2005/0066222, 2005/0065962, and 2005/0063374 to Rowan, et al., whose disclosures are incorporated herein by reference, describe "a method, apparatus, and system for accessing units of storage that depends at least in part on an address of the unit of storage and the time that data was written to the unit of storage." A data store is provided that identifies the location of data at a requested address in response to a time specification and a data request. In one embodiment, "the location is chosen from a time store associated with a data store and a current store associated with the data store, or some combination. The identifying step can include determining whether the data at the requested address at the specified time was changed after the specified time. If data at the requested address was changed after the specified time, the identified location is the time store. If the data was not changed, the identified location is the current store."

SUMMARY OF THE INVENTION

Embodiments of the present invention provide efficient methods and apparatus for providing continuous data protection (CDP) in a data processing system.

In embodiments of the present invention, a data storage system receives, typically from a host computer, a first input/output (I/O) command to store data identified by a logical address of a first logical volume. The storage system stores the data at one or more physical locations, which the storage system associates with one or more respective partitions of the first logical volume. Configuration records, including a partition descriptor record (PDR), facilitate the association between the physical locations and the partitions.

The storage system may be configured to associate with the data of a partition a timestamp indicating the time at which the data was stored in the system. In an embodiment of the present invention, when a timestamp I/O command is issued to store new data at the partition, a new PDR associated with the partition is generated with a timestamp, and the new data is written to a new physical location indicated by the new PDR. Prior data associated with the partition before the timestamp I/O command was issued remains stored in the storage system at the physical location originally associated with the data.

A prior PDR associated with the original physical location is linked to the new PDR, using pointers that point from one PDR to another PDR. Such pointers between PDRs provide a means for linking the PDRs and for accessing prior data of the partition. When a timestamp I/O command is issued to read data that was written at a given time, the most recent PDR, termed the current PDR, is accessed first by the storage system. If the time indicated by the read command is prior to the timestamp of the current PDR, pointers between the current PDR and the prior PDRs are followed until a PDR is found with a timestamp closest in time to, and before, the given time. This PDR is referred to hereinbelow as the antecedent PDR. The antecedent PDR gives the address of the data that was current at the given time, and the command is implemented by reading this data.

A copy command copies a prior status of a first logical volume, as defined by a time given in the command, to a second logical volume. Hereinbelow, the first logical volume is referred to as the source volume, and the second volume is referred to as the target volume. To implement the command, the storage system first generates configuration records defining the target logical volume. Then, for each partition of the source volume, the storage system locates the antecedent PDR, and each antecedent PDR is copied and associated with the target logical volume. In this manner, a logical volume copy may be made without copying physical data. The target volume reflects the status of the source volume at the given prior time, as indicated by the PDR timestamps of the source volume.

There is therefore provided, according to an embodiment of the present invention a method for continuous data protection in a data storage system, including:

receiving a first write command to write first data to a partition of a logical volume;

in response to the first write command, generating a first partition descriptor record (PDR) having a first timestamp;

storing the first data at a first physical location;

associating the first PDR with the first physical location;

receiving a second write command, subsequent to the first write command, to update the first data with second data;

responsively to the second write command, generating a second PDR having a second timestamp;

storing the second data at a second physical location;

associating the second PDR with the second physical location;

generating a pointer between the first PDR and the second PDR; and accessing the first PDR using the pointer in response to a read command indicating a time prior to the second timestamp.

Generating the first PDR may include associating the partition of the logical volume with the first PDR, and generating the second PDR may include disassociating the partition from the first PDR and associating the partition with the second PDR. Typically, associating the partition of the logical volume with the first PDR includes generating a pointer to the first PDR in a partition hash table.

The method may also include linking the first and second PDRs to each other by a binary tree responsively to one or more write commands subsequent to the first and the second write commands. The binary tree may be generated by an Adelson-Velskii and Landis (AVL) method.

In an embodiment, accessing the first PDR includes comparing the first timestamp with the time indicated by the read command.

In one embodiment, accessing the first PDR includes comparing the first timestamp with the time indicated by the read command and with a predetermined threshold period of time.

In a disclosed embodiment, the first PDR includes a bitmap field and generating the second PDR includes using the bitmap field to determine that the first write command and the second write command do not comprise a single split write command.

Typically, the logical volume includes a source logical volume, the partition includes a first partition, the method including, responsively to a volume copy command to copy the source logical volume to a target logical volume:

generating a third PDR having the first timestamp;

associating the third PDR with the first physical location; and associating with the third PDR a second partition of the target logical volume.

There is further provided, according to an embodiment of the present invention, apparatus for continuous data protection in a data storage system, the apparatus including:

a control unit, which is adapted to:

receive a first write command to write first data to a partition of a logical volume;

in response to the first write command, generate a first partition descriptor record (PDR) having a first timestamp;

store the first data at a first physical location;

associate the first PDR with the first physical location;

receive a second write command, subsequent to the first write command, to update the first data with second data;

responsively to the second write command, generate a second PDR having a second timestamp;

store the second data at a second physical location;

associate the second PDR with the second physical location;

generate a pointer between the first PDR and the second PDR; and access the first PDR using the pointer in response to a read command indicating a time prior to the second timestamp.

The present invention will be more fully understood from the following detailed description of the embodiments thereof, taken together with the drawings in which:

BRIEF DESCRIPTION OF THE DRAWINGS

FIG. 3 is a list of sets of partition descriptor records (PDRs) in the cache of FIG. 2, in accordance with an embodiment of the present invention;

FIG. 9 is a listing of the PDRs of FIG. 8B, in accordance with an embodiment of the present invention.

DETAILED DESCRIPTION OF EMBODIMENTS

Figure 1:
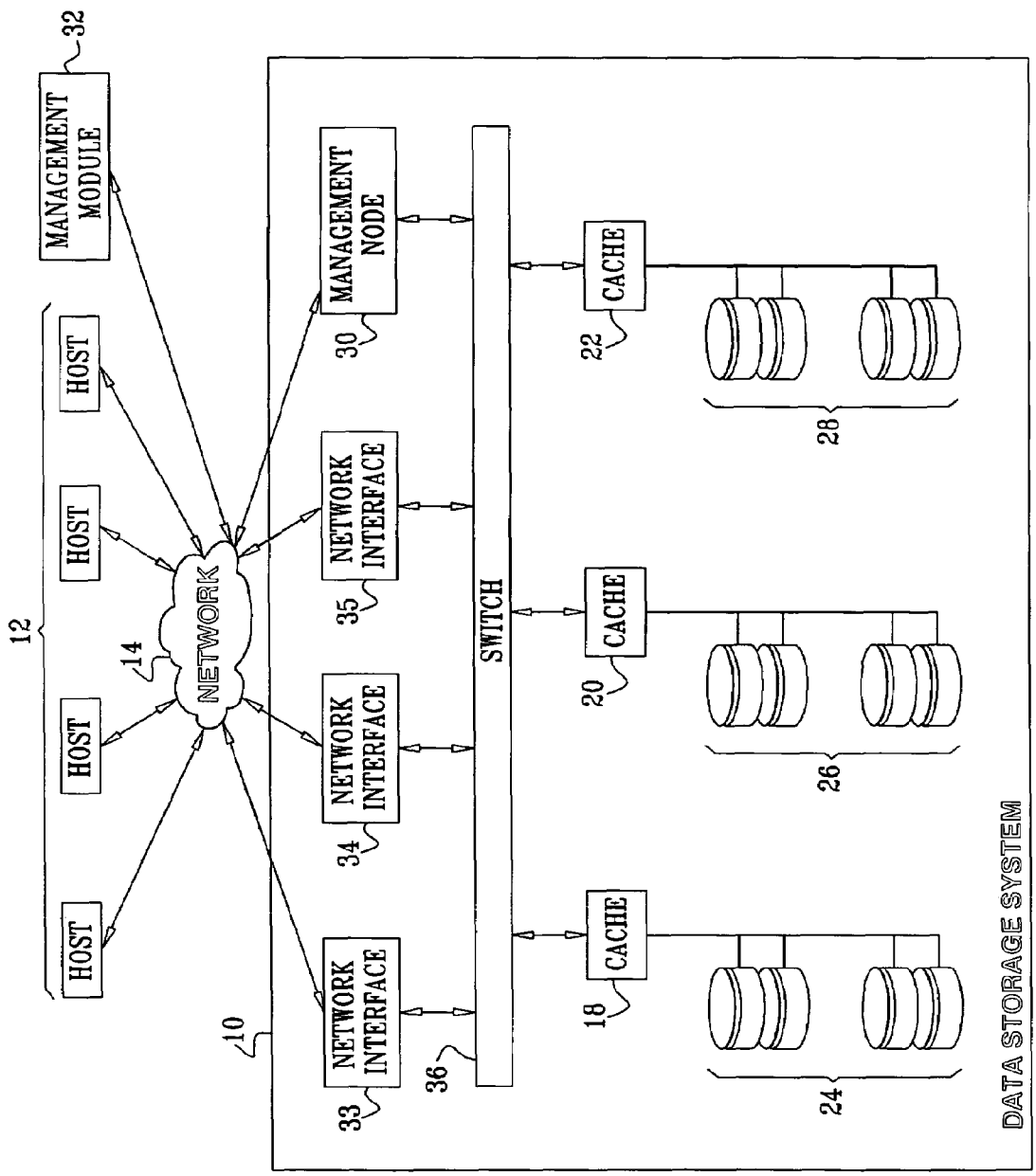
FIG. 1 is a schematic diagram of a data storage system, in accordance with an embodiment of the present invention.

Reference is now made to FIG. 1, which schematically illustrates a storage system 10, in accordance with an embodiment of the present invention. Storage system 10 receives, from one or more host computers 12, input/output (I/O) commands, comprising commands to read or write data at logical addresses on logical volumes. Host computers 12 are coupled to storage system 10 by any means known in the art, for example, via a network or by a bus. Herein, by way of example, host computers 12 and storage system 10 are assumed to be coupled by a network 14.

The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume V1.

Storage system 10 typically operates in, or as, a network attached storage (NAS) or a storage area network (SAN) system. However, it will be understood that the scope of the present invention is not limited to storage systems operating in any particular configuration. Rather, the scope of the present invention includes systems operating in any suitable configuration used for storing data.

I/O commands to read data comprise at least two fields, a first field specifying the command type (i.e., read), and a second field specifying the logical address, which includes the logical volume. I/O commands to write data comprise at least three fields, a first field specifying the command type (i.e., write), a second field specifying the logical address, and a third field specifying the data that is to be written. In embodiments of the present invention, I/O commands may include an additional field indicating a time, which may be the current time for a write command, or a prior time for a read command.

Storage system 10 comprises one or more caches, indicated in FIG. 1 as caches 18, 20, and 22. However, it will be appreciated that the number of caches used in system 10 may be any convenient number. Caches 18, 20, and 22 are distinguished from each other to facilitate the exposition of cache operation hereinbelow. All caches in system 10 are assumed to operate in substantially the same manner and to comprise substantially similar elements. Elements in the caches of the system, and operations of the caches, are described in more detail below with respect to FIG. 2.

Each of the caches is assumed to be approximately equal in size and is also assumed to be coupled, by way of example, in a one-to-one correspondence with a set of physical storage. Those skilled in the art will be able to adapt the description herein, mutatis mutandis, to differently-sized caches and to caches and storage devices in other correspondences, such as the many-to-many correspondence described in US Patent Publication 2005/0015566, titled "Data Allocation in a Distributed Storage System," which is assigned to the assignee of the present invention and which is incorporated herein by reference. Each set of physical storage comprises multiple slow and/or fast access time mass storage devices, hereinbelow assumed to be multiple hard disks. By way of example, FIG. 1 shows caches 18, 20, and 22 coupled to respective sets of physical storage 24, 26, and 28. In response to an I/O command, cache 18, by way of example, may read or write data at addressable physical locations of physical storage 24. A single addressable physical location, also referred to herein as a track, typically contains 128 data blocks.

In some embodiments of the present invention, a management node 30 of storage system 10 receives from a management module 32 a formation command to form a logical volume V1. The management module may be run from a dedicated external computing system or from one or more of the host computers. The purpose of the formation command is to permit host computers 12 to specify logical addresses of V1 in subsequent I/O commands.

In response to the formation command, management node 30 creates routing records which indicate how the logical addresses of V1 are to be distributed across caches 18, 20, and 22. The routing records do not specify the physical location on the disks of each logical address, but only the cache that is responsible for storing the associated data. In an embodiment of the present invention, the routing of logical addresses is implemented according to methods described in the above-referenced US Patent Publication 2005/0015566. According to the aforementioned methods, management node 30 assigns logical addresses to groups, herein referred to as partitions. Each partition may comprise a set of logical addresses equal in size to a track. Management node 30 determines the allocation of partitions among the one or more caches to provide an approximately equal number of partitions on each cache. The allocation is such that when data blocks of a logical volume are written to storage system 10, the blocks will be distributed in a balanced manner across all caches. Furthermore, the association of partitions with caches may be done in such a manner that the partitions of one logical volume associated with a specific cache, such as cache 18, may have the same identifying names, or numbers, as the partitions of additional logical volumes that are also associated with cache 18. That is, if a partition identified as P1 and comprising logical addresses of logical volume V1 is stored on cache 18, then partitions of additional volumes V2 and V3 with the identification of P1 may also be stored on cache 18.

The routing records, indicating the association of logical addresses of logical volumes with partitions and the association of the partitions with caches, are distributed by the management node to one or more generally similar network interfaces of storage system 10. The network interfaces are indicated in FIG. 1 as three network interfaces 33, 34, and 35, but it will be understood that system 10 may comprise any convenient number of network interfaces.

Figure 2:
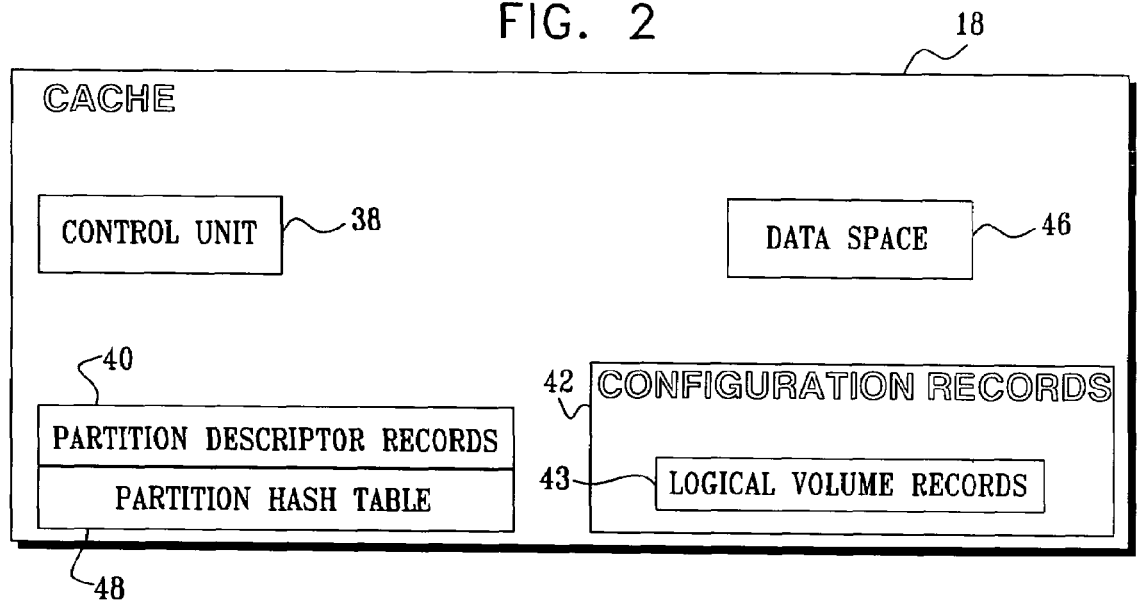
FIG. 2 is a schematic diagram of a cache in the data storage system of FIG. 1, in accordance with an embodiment of the present invention.

Referring back to the formation command to form volume V1, management node 30 also distributes messages to caches 18, 20, and 22 instructing the caches to form V1. Implementation of the formation command by the caches is described further hereinbelow (FIG. 2).

Subsequent to the formation of V1, network interfaces 33, 34, and 35 receive I/O commands from host computers 12 specifying logical addresses of V1. The network interfaces use the routing records to break the commands into I/O instructions, or command subsets, that are then distributed among caches 18, 20, and 22. By way of example, network interface 33 may receive a command to read data at a logical address comprising blocks 1000 through 1019 of logical volume V1. Network interface 33 uses the routing records to convert the logical address (which comprises 20 blocks) to partition addresses, such as a first partition address comprising blocks 125 through 128 on a partition P5 of cache 18, and a second partition address comprising blocks 1 through 16 on a partition P6 of cache 20.

Having determined the partition addresses associated with caches 18 and 20, network interface 33 then sends I/O instructions specifying the partition addresses to the respective caches 18 and 20. Each cache, upon receiving the respective instruction, then determines a physical location, i.e., a track, associated with the specified partition. Thus, following the example described above, cache 18 identifies the track associated with its partition P5, and cache 20 identifies the track associated with its partition P6. Each cache will then read data from the indicated track according to processes described further hereinbelow.

Routing of commands from network interfaces 33, 34, and 35 to each cache is typically performed over a network and/or a switch. Herein, by way of example, the network interfaces are assumed to be coupled to the caches by a switch 36.

Figure 4:
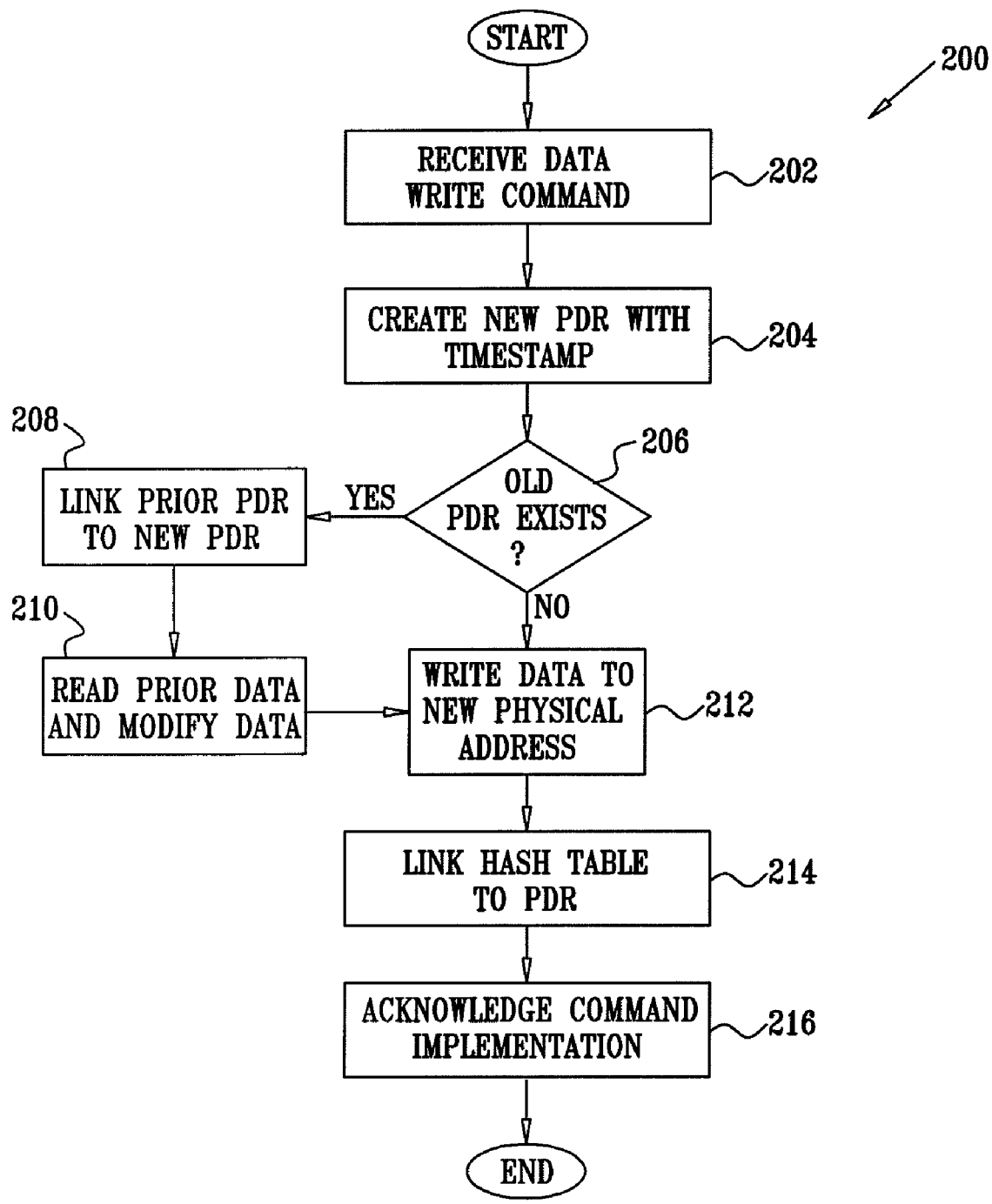
FIG. 4 is a flowchart of a process implemented when a timestamp data write command is received by the data storage system of FIG. 1, in accordance with an embodiment of the present invention.
Figure 5:
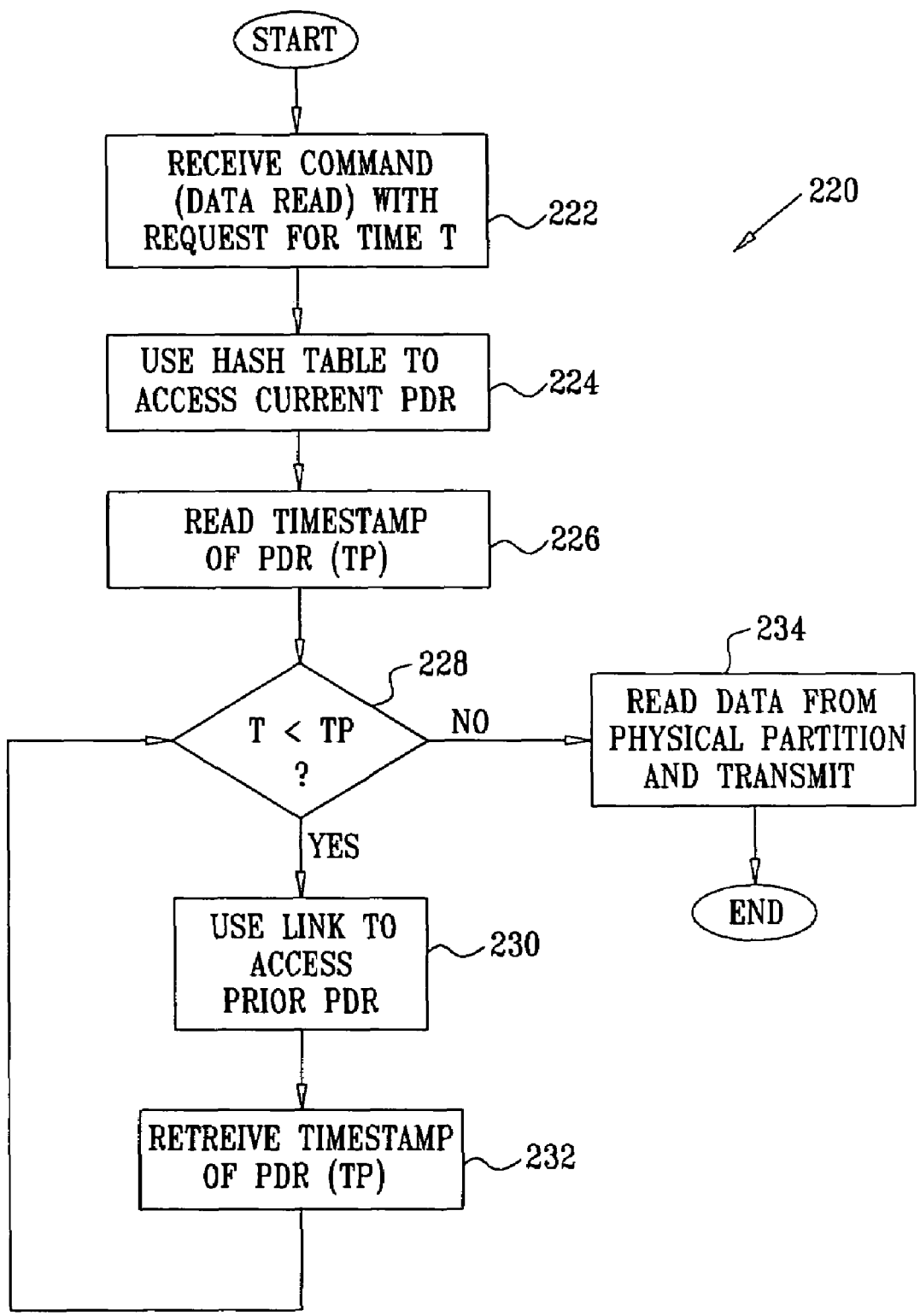
FIG. 5 is a flowchart of a process implemented when a timestamp data read command specifying a prior time is received by the data storage system of FIG. 1, in accordance with an embodiment of the present invention.

FIG. 2 is a schematic diagram of elements of cache 18 of FIG. 1, in accordance with an embodiment of the present invention. A control unit 38 performs the processing and communications functions of the cache. The control unit manages communications with the network interfaces over switch 36. Alternatively, in configurations of the present invention in which storage system 10 comprises only a single cache 18, control unit 38 communicates directly with host computers 12 over network 14. Control unit 38 also performs the tasks of reading and writing data to physical storage 24. The control unit determines tracks of the physical storage at which to read and write data, performing this determination by using partition descriptor records 40, herein referred to as PDRs, and by using configuration records 42, according to processes described hereinbelow (FIGS. 4 and 5). The PDRs of cache 18 associate the partitions allocated to cache 18 with tracks of physical storage 24.

Control unit 38 also communicates with management node 30. In response to management instructions to form or to copy logical volumes, the control unit creates configuration records 42 comprising logical volume records 43. Configuration records 42 may also comprise additional records such as those used to support instant copying, described in the U.S. patent application Ser. No. 11/123,993, titled "Data Storage Methods for Hierarchical Copies," filed May 6 2005, which is incorporated herein by reference.

Configuration records 42, as well as PDRs 40, which are collectively referred to as meta-data, may be managed using any data management paradigm known in the art, as described in the abovementioned U.S. patent application Ser. No. 11/123,993.

Logical volume records 43 comprise two fields, these being a logical volume name field and a size field, typically measured in thousands of partitions. It will be appreciated that the logical volume names used herein are for purposes of illustration only, as numeric values are typically used in computer communications. Additional fields comprised in a logical volume record may be date and security key fields.

Cache 18 also comprises a data space 46, wherein data may be manipulated or temporarily stored during an I/O process.

Cache 18 further comprises a partition hash table 48 used by control unit 38 to access PDRS.

As described above, the configuration records are generated in response to instructions from management node 30. PDRs 40 are created only in response to write instructions from the network interfaces.

FIG. 3 shows three sets 1, 2, and 3 of PDRs 40 that may exist in cache 18 at three respective periods of time, in accordance with an embodiment of the present invention. During typical operation, caches may maintain several hundred thousand PDRs or more. Each PDR identifies a physical location associated with a particular partition and timestamp. The physical location is identified by a physical location field 84. Typically the PDR also comprises fields 78 and 76, respectively indicating the partition and logical volume associated with the PDR. In an embodiment of the present invention, the PDR also comprises fields used by CDP read and write processes (FIGS. 4 and 5), as follows: a link address field 70, a prior link field 72, a forward link field 74, a timestamp field 82, and a bitmap field 80.

Figure 10:
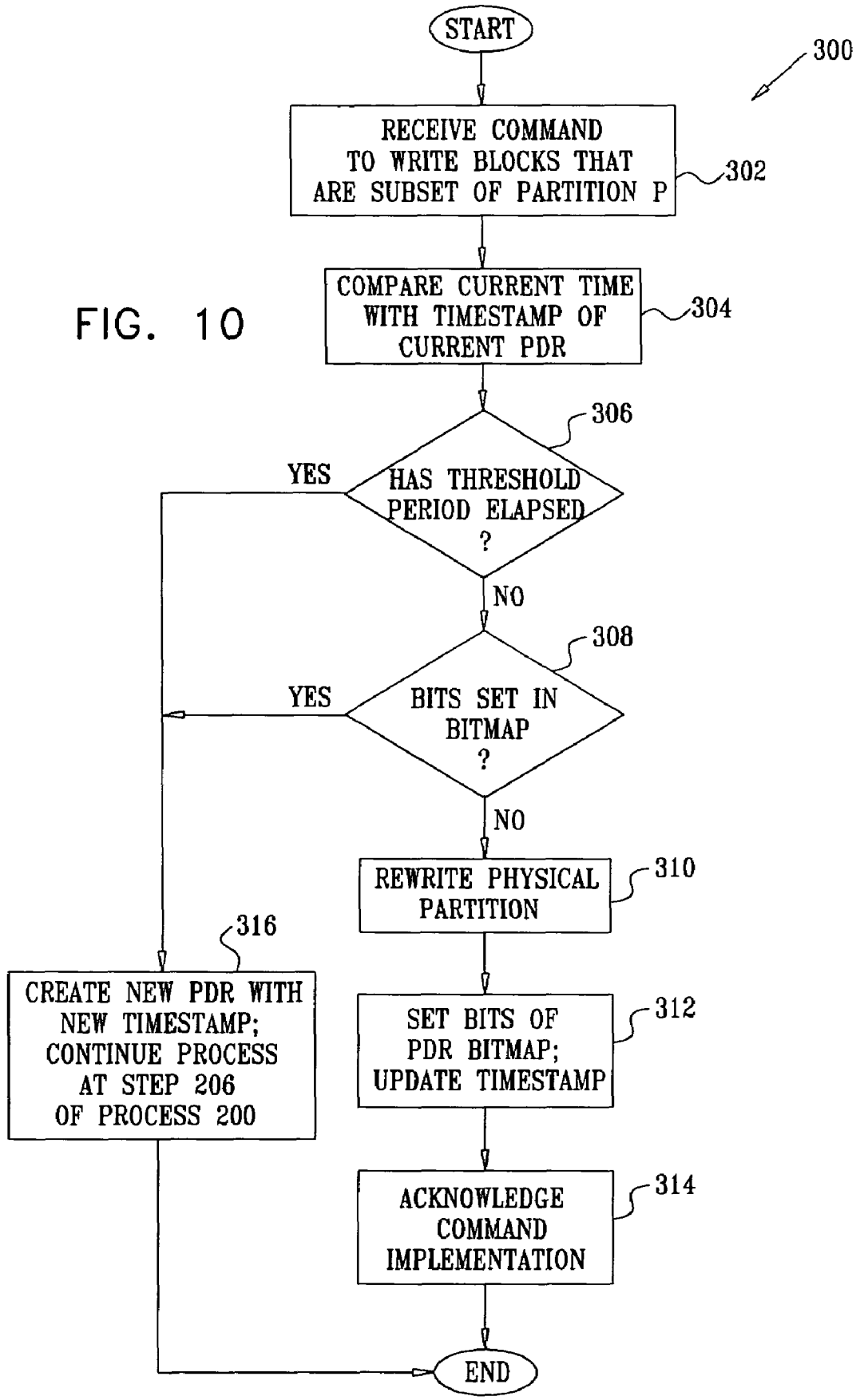
FIG. 10 is a flowchart of a process implemented when a timestamp data write instruction is received by a cache, in a system configured to handle split write commands, in accordance with an embodiment of the present invention.

For a given PDR, prior link field 72 acts as a pointer to a PDR prior to the given PDR, and forward link 74 acts as a pointer to a PDR following the given PDR. Timestamp field 82 indicates the time at which the given PDR was generated, typically according to a clock of control unit 38, though in alternate embodiments the timestamp may be provided by a clock of the network interfaces or of one of hosts 12. Fields 70, 72, and 74 are used to chain PDRs together, field 70 acting as an identifier of a given PDR, prior link field 72 pointing to the identifier of the PDR created directly before the given PDR, and forward link field 74 pointing to the identifier of the PDR created directly after the given PDR. Fields 70, 72, and 74 are described further in relation to process 200 (FIG. 4). The bitmap field 80 is described hereinbelow with respect to process 300 (FIG. 10).

Set 1 of FIG. 3 comprises a record 52, which is a PDR with a link address P00101 (referred to hereinbelow as PDR P00101), which may be generated when cache 18 receives a command to write data for the first time to a partition P3 of a volume V5. Because no prior data was written to partition P3, prior link field 72 of PDR P00101 is blank. A timestamp of H00043902 is indicated in timestamp field 82 and a physical location of PHYYY01 is indicated in physical location field 84. Set 1 typically also comprises other records, such as a record 54, generally similar to record 52, for a partition P5 of volume V5.

Sets 2 and 3 of FIG. 3 are derived from Set 1, and their generation is described below, with reference to FIG. 4.

FIG. 4 is a flowchart of a process 200 implemented when a timestamp data write command is issued to update partition P3 of logical volume V5 with new data, in accordance with an embodiment of the present invention. At an initial step 202, control unit 38 of cache 18 receives a data write instruction from one of network interfaces 33, 34, and 35. For the sake of illustration, the instruction is assumed to be derived from a write command specifying data that is to be written to blocks 100 through 110 of partition P3. Before the instruction is received, PDRs 40 are assumed to comprise PDR P00101 of Set 1 (FIG. 3).

To implement the timestamp data write instruction, control unit 38 creates at a step 204 a new PDR P00103, indicated as record 58 in Set 2 of FIG. 3. PDR P00103 gives the address of the physical location at which an updated partition P3, comprising the new data of blocks 100 through 110, will be stored. A current time H00089887 is inserted into the timestamp field, and a physical address PHYYY03 is assigned to the link address field 70.

Next, at a step 206, the prior PDR associated with the partition is found by searching the PDR records. Partition hash table 48 (FIG. 2) is typically used to facilitate the search for the prior PDR.

If no prior PDR exists for P3, processing continues at a step 212. If a prior PDR does exist, as assumed above, then at a step 208 the prior PDR and the new PDR are linked together. The prior PDR P00101 is modified as indicated by record 56 of Set 2 (FIG. 3). The forward link field of PDR P00101 is set to the link address of PDR P00103, and the prior link field of PDR P00103 is set to the link address of PDR P00101. At a step 210, data at the physical location PHYYY01 addressed by PDR P00101 is read into data space 46 (FIG. 2), and blocks 100 through 110 are changed according to the write instruction, thereby generating an updated partition of data.

Subsequently, at step 212, the updated partition of data is written to the new physical location, PHYYY03. Next, at a step 214, partition hash table 48 is linked to PDR P00103 by including in the partition hash table a pointer associating P3 with PDR P00103. A pointer from the partition hash table to the prior PDR P00101 is removed, thereby disassociating P3 from PDR P00101. At this point, the write instruction has been implemented, and cache 18 generates an acknowledgement to management node 30 at a step 216.

If a second write instruction to the same partition is now received after implementation of the first write instruction described above, process 200 is again implemented, thereby creating a further new PDR P00104, shown as record 62 of Set 3 (FIG. 3). The prior PDR P00103 is modified as indicated by record 60 of Set 3. The forward link field of PDR P00103 is set to the link address of PDR P00104, and the prior link field of PDR P00104 is set to the link address of PDR P00103. Prior PDR P00101 remains unchanged.

It may thus be understood that in order to make data stored at any prior time in volume V5 available for subsequent access, cache 18 does not write over old data of a partition when a new write command is received, but instead stores an updated partition incorporating the new data at a new physical location. A new PDR is created and is associated with the new physical location. The prior data remains at the original physical location, which is pointed to by the original PDR, and the original PDR is updated so that it and the new PDR are linked. It may likewise be understood that the amount of metadata necessary for implementing CDP is directly proportional to the amount of data that has been updated in the logical volume and is therefore relatively small in comparison with the amount of modifiable data stored in the logical volume. Consequently, the implementation of the present invention is efficiently scalable, in that the size of a logical volume may be increased with only a proportional increase in the amount of metadata needed to manage the logical volume.

FIG. 5 is a flowchart of a process 220 implemented when a timestamp data read command is received by cache 18, in accordance with an embodiment of the present invention. At an initial step 222, control unit 38 of cache 18 receives a data read instruction from one of network interfaces 33, 34, and 35, the instruction typically being generated in response to a read command from one of host computers 12. By way of example, the instruction is assumed to be received from network interface 33. The instruction is further assumed to be a request to read data at blocks 100 through 110 of partition P3 of logical volume V5.

The timestamp data read command comprises a prior time, T, indicating the desired prior point in time of data to be accessed. To implement the read instruction, control unit 38 first uses the partition hash table to access, at a PDR access step 224, the most recent PDR, herein termed the current PDR, associated with P3. At a timestamp access step 226, a timestamp TP, of the current PDR is read and, at a decision step 228, TP is compared with the time, T, given by the read instruction.

If TP is greater than T, meaning that TP is more recent than T, then the current PDR contains changes made subsequent to the given time, T. Conversely, if TP is not greater, but rather less than or equal to T, then no changes have occurred in partition P3 since the time given by the read command. Because no changes have occurred, the data at the physical location indicated by the current PDR satisfies the read command, and the "no" branch of step 228 is followed to a step 234. If changes have occurred, then prior data is sought by the read command. In this case, the "yes" branch of step 228 is followed to a PDR access step 230, which is followed by a timestamp access step 232, step 230 and 232 in effect reiterating steps 224 and 226. It may be understood that the difference between step 224 and step 230 is that the current PDR is accessed through the hash table, whereas the prior PDR is accessed through the prior link field 72 of the current PDR.

The loop of steps 228-232 is reiterated until the antecedent PDR is identified. The antecedent PDR is the PDR with a timestamp closest in time to, and before, the time indicated by the read command. At this point, the "no" branch of step 228 is followed to step 234, at which the data indicated by the identified PDR is read and transmitted, thereby completing implementation of the read command.

Figure 6:
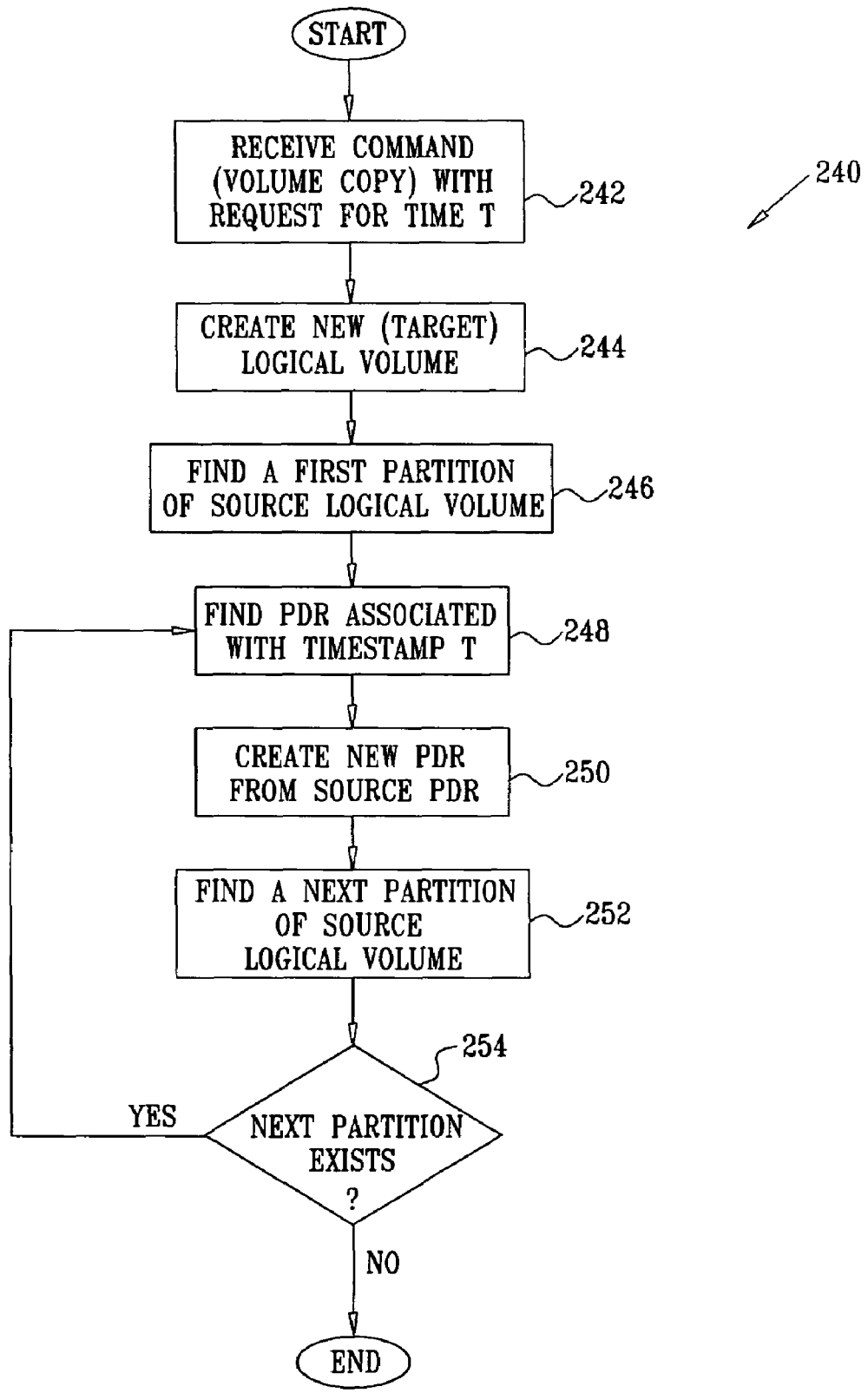
FIG. 6 is a flowchart of a process implemented when a timestamp volume copy command is received by the data storage system of FIG. 1, in accordance with an embodiment of the present invention.

FIG. 6 is a flowchart of a process 240 implemented when a timestamp volume copy command is received by cache 18, in accordance with an embodiment of the present invention. At an initial step 242, control unit 38 of cache 18 receives a timestamp volume copy command comprising a given prior time T from one of network interfaces 33, 34, and 35. The command effects copying the status of a source logical volume at the given time T to a target logical volume.

Upon receiving the copy command, the control unit generates, at a step 244, configuration records defining the target logical volume as a logical volume record 43, as described above with reference to FIG. 2. Subsequently, at a step 246 the control unit locates an initial partition of logical volume V5. At a step 248 the antecedent PDR is located, by a reiteration process substantially similar to that described in reference to process 220 above, using steps 228, 230, and 232. At a step 250, the physical location field of the antecedent PDR is read and copied to a new PDR, which is associated with the target logical volume. Both the source and the target PDR thus point to the same physical location. At a subsequent step 252, the next partition of logical volume V5 is accessed, and if such a partition exists, then at a decision step 254, the "yes" branch is followed to step 248, so that steps 248-254 are iterated until all partitions of V5 have been accessed.

For the sake of illustration, assume that the copy command specifies that logical volume V5 is to be copied to a target volume V10 according to the status of logical volume V5 at a time H0090000. Furthermore, the PDRs of partition P3 of logical volume V5 are assumed to comprise the PDRs of Set 3 of FIG. 3. As described above, step 246 of FIG. 6 will be reiterated many times, and at one of these times the current PDR of partition P3, identified by the link address P00104, will be accessed. At step 248, the PDRs associated with partition P3 are accessed by following the addresses in the prior link fields of each PDR, until the antecedent PDR for time H0090000 is found. This is PDR P00103, which has a timestamp of H00089887 (Set 3 of FIG. 3). Thus, in step 250, PDR P00103 is copied to a new PDR associated with the target logical volume V10. At step 252, processing proceeds at a subsequent partition of V5, and the identification of desired PDRs is reiterated until all partitions of V5 have been processed.

It will be appreciated that in process 240 the implementation of the copy command does not copy physical data and may thus be considered a form of instant copy, such as is described in more detail in the abovementioned U.S. patent application Ser. No. 11/123,993. The target volume generated by process 240 comprises all partitions of the source volume as of the given prior time T, based on the PDR timestamps of each partition of the source volume.

Figure 7:
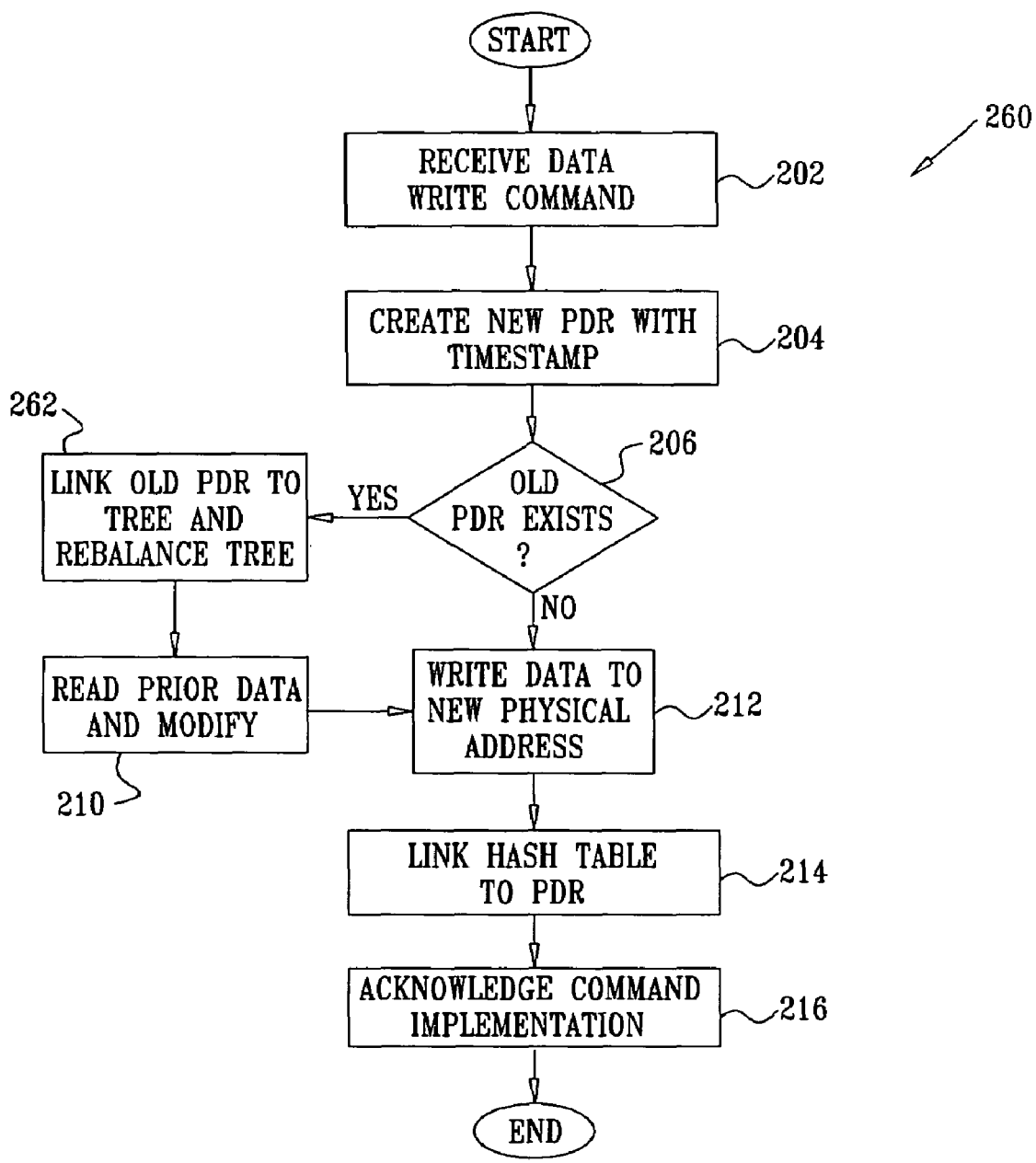
FIG. 7 is a flowchart of a process implemented when a timestamp data write command is received by the data storage system of FIG. 1, in accordance with an alternative embodiment of the present invention.

FIG. 7 is a flowchart of a process 260 implemented when a timestamp data write command is received by cache 18, wherein partitions are linked by a balanced binary tree, in accordance with an embodiment of the present invention. Except as described below, process 260 is substantially the same as process 200 (FIG. 4). Process 200 described a simple, linked list structure for managing the successive instances of PDRs associated with a partition. Alternative mechanisms may be used for managing the structure of linked partitions. For example, balanced binary trees provide efficient structures for searching for a prior PDR, since balanced trees have insert and search times on the order of log n, n being the number of tree nodes in the structure. In an implementation of the present invention, the nodes of a binary tree comprise prior PDRs. Each node comprises two branches, a left branch pointing to a PDR with an earlier timestamp and a right branch pointing to a PDR with later timestamp. A balanced binary tree structure may be achieved using methods well known in the art, such as the method of Adelson-Velskii and Landis (AVL), wherein a process of rebalancing the tree is implemented each time a new node is added to the tree.

http://msdn.microsoft.com/library/default.asp?url=/library/en-us/dnvs05/html/datastructures20_4.asp.

When storage system 10 is configured to implement PDR linking using balanced binary trees, link fields of PDRs are manipulated in order to create a tree, rather than a simple linked list. Other than this manipulation, the process of writing new data follows the steps of process 200 (FIG. 4). Only one step of process 200 is changed to implement process 260. As indicated in FIG. 7, this step is a step 262, at which a new PDR is not automatically linked to the prior PDR as described at step 208, but rather, the prior PDR is added to a balanced binary tree comprising all prior PDRS. The tree is then rebalanced, and the new PDR is linked to the root node of the tree. Processing of the write command then proceeds according to process 200 at a step 210.

Figure 8A:
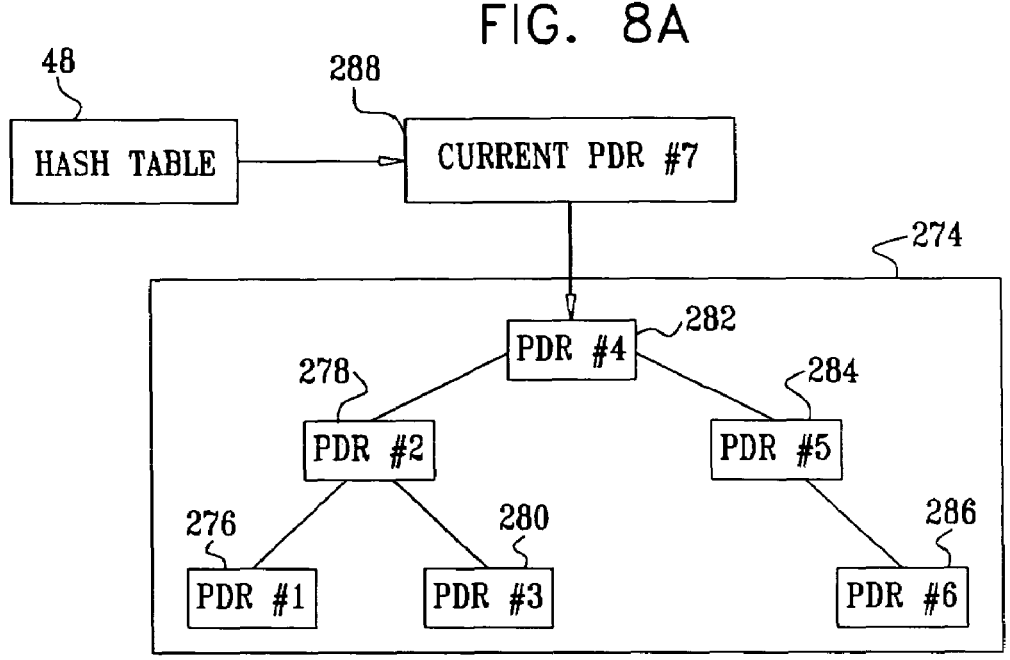
FIG. 8A and FIG. 8B are exemplary diagrams of the links between PDRs in a balanced binary tree, in accordance with an embodiment of the present invention.
Figure 8B:
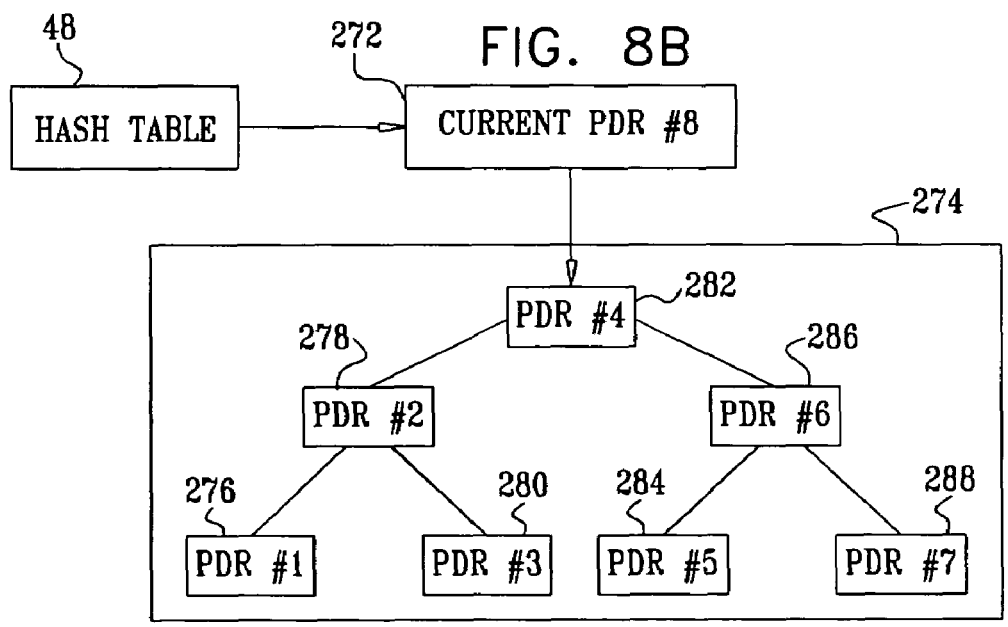

FIG. 8A and FIG. 8B are exemplary diagrams of the links between a series of PDRs of a partition when a balanced binary tree structure is used to link the PDRs, in accordance with an embodiment of the present invention. For the sake of illustration, seven PDRs are shown to be associated with the partition in FIG. 8A. Hash table 48 points to a PDR 288, which is the current PDR, and which is the seventh PDR (#7) in the series. Prior PDRs are structured as a balanced tree 274. Current PDR 288 points to root PDR 282 of tree 274. Sequentially, root PDR 276 is prior PDR #4, and is shown having branches to two nodes, PDR 278 (#2) and prior PDR 284 (#5). The remaining prior PDRs are arranged in the tree such that no branch is more than one node longer than any other branch, following the methods of balanced binary trees cited above. Three PDRs of FIG. 8A are shown as having no left or right branches, these being PDRs 276, 280, and 286.

FIG. 8B shows changes that are incorporated into balanced tree 274 of FIG. 8A after process 260 (FIG. 7) is performed, thereby adding to the series of PDRs an eighth PDR, indicated as PDR 272 (#8). Hash table 48 is disassociated from PDR 288 and is linked, instead, to the new PDR 272, which becomes the current PDR. PDR 288 is added to balanced tree 274, and the tree is rebalanced. After rebalancing, current PDR 272 points to root PDR 276. The right branch of PDR 276 points to PDR 278 (#2) and the left branch points to PDR 286 (#6). The remaining prior PDRs are arranged in the tree such that no branch is more than one node longer than any other branch, following the methods of balanced binary trees cited above. Four PDRs of FIG. 8 are shown as having no left or right branches, these being PDRs 276, 280, 284, and 288.

FIG. 9 is a listing of the PDRs of FIG. 8B, in accordance with an embodiment of the present invention. As indicated in the listing, the prior and forward links (fields 72 and 74, respectively), which are used in the simple linked list structure of FIG. 3, are replaced by three link fields: left link field 292, right link field 294, and parent link field 296. Current PDR 272, which is PDR #8, is linked to root PDR 276 (prior PDR #4), by identifying the link address P00004 of PDR 276 in the right link field of PDR 272. (Alternatively, any other link field may be used to link the current PDR to the root PDR.) The root PDR is linked to the current PDR by identifying the address P00008 in the parent link field. As described hereinabove (FIG. 8B), the root PDR has two branches, PDR 278 and PDR 286, indicated respectively by specifying P00002 in the left link field and P00006 in the right link field.

PDR 278 has two branches, PDR 276 and PDR 280, indicated respectively by specifying P00001 in the left link field and P00003 in the right link field. Parent node PDR 282 of PDR 278 is indicated by specifying P00004 in the parent field of PDR 278.

PDR 286 has two branches, PDR 284 and PDR 288, indicated respectively by specifying P00005 in the left link field and P00007 in the right link field. Parent node PDR 282 of PDR 286 is indicated by specifying P00004 in the parent field of PDR 286.

PDRs 276, 280, 284, and 288, have no left and right branches, and merely indicate the parent PDRs in their respective parent fields.

FIG. 10 is a flowchart of a process 300 implemented when a timestamp data write instruction is received by cache 18, in a system configured to handle split write commands, in accordance with an embodiment of the present invention. Due to considerations related to balancing communications time and internal processing time, storage system 10 may split a long write command directed to a single partition into several separate write instructions. The split instructions may provide instructions related to changes to different sets of blocks of a single partition. In this case, implementation of write process 200 of FIG. 4 may lead to an erroneous situation in which the different sets of blocks were written with different PDRs, each with a different timestamp.

One method for preventing this situation is to assume that all writes to a given partition that occur within a certain period of time, as designated by a predetermined threshold period of time, originate from the same write command, and should therefore be stored at the physical location designated by the current PDR. The threshold may be set as a period slightly larger than the average time for writing a partition, which may be on the order of 1 second. The threshold may also be set to larger values, such as a minute or more, depending on the granularity of the instruction splits.

Using the threshold measure, no timestamp error occurs even if two instructions originating from separate commands are stored at the same physical location, as long as the commands do not request changes to the same blocks. To prevent this error of overwriting blocks, PDR bitmap field 80 (FIG. 3) is used to indicate blocks changed since the current PDR was created. For an exemplary storage system in which partitions comprise 512 blocks, bitmap field 80 comprises 512 corresponding bits. When a PDR is initially created, all bits are set to zero. Subsequently, as blocks of the PDR are changed, the corresponding bits are set to one. If a write instruction requests a change to a block that has already been changed, as indicated by the corresponding bit, then the write instruction is treated as being part of a new command, and a new PDR is generated.

Implementation of process 300 begins with an initial step 302, at which control unit 38 of cache 18 receives a data write instruction from one of network interfaces 33, 34, and 35. For the sake of illustration, the instruction is assumed to be derived from a write command specifying data that is to be written to blocks 100 through 110 of a partition P3 of logical volume V5. It is also assumed that the write command may be part of a split command.

In response to receiving the write instruction, control unit 38 does not automatically create a new PDR, as was the case at step 204 of process 200. Instead, at a step 304, the control unit reads the timestamp of the current PDR. At a decision step 306, the control unit then determines whether a sufficient period of time has elapsed since data addressed by the current PDR was written. This is determined by adding the predetermined threshold time to the timestamp of the current PDR, and comparing the sum of these times with the current time. If a sufficient period has elapsed, then it is assumed that the write instruction originated from a new write command so that, at a step 316, a new PDR is created, and processing continues at step 206 of standard write process 200. By contrast, if sufficient elapsed time has not passed, then the "no" branch of step 306 is followed to a second decision step 308. At this step, the bitmap field of the current PDR is checked, in order to determine if any of blocks 100 through 110 have been changed since the PDR was created. If they have been changed, then the "yes" branch of step 308 is followed to step 316, and processing continues at this step as described hereinabove.

If the bitmapped blocks have not been changed, then the current partition may be updated with the new blocks. The "no" branch of step 308 is followed to a step 310, at which the data at the physical location indicated by the PDR is read into data space 46. The blocks of the partition are updated according to the write instruction, and the data is rewritten to the original physical location. At a step 312, the current PDR is updated to reflect the new timestamp as well as the new bitmap, which indicates the blocks that have been changed. At this point, the write instruction has been implemented, and the control unit returns an acknowledgement at a step 314.

It may be understood that storage system 10 will operate more efficiently when partition sizes are defined to reflect the size of typical write commands. That is, when commands typically update only a few blocks of a partition, a small partition size, such as 100 blocks, would be more efficient than a larger size. Small partition sizes increase the number of PDRs that must be maintained, but reduce the overall amount of storage space required by the system. An exemplary choice of partition size may be 1 MB for block sizes of ½ KB, in which case a partition comprises 2000 blocks.

Although the embodiments described hereinabove relate to a distributed data storage system serving host computers over a network, it will be appreciated that the principles of the present invention may also be applied, mutatis mutandis, to storage systems in other configurations, such as stand-alone systems serving individual or multiple hosts. The methods described hereinabove may also be applied to additional data storage management commands such as a command to copy a source volume to multiple target volumes, some of which may be read-only volumes. It will thus be appreciated that the embodiments described above are cited by way of example, and the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

We claim:

1. A method for data protection, comprising:

dividing a logical volume in a data storage system into partitions having equal sizes;

providing a first data structure, a second data structure, and a third data structure which are logically connected in accordance with a hierarchy and which are sequentially accessed in accordance with the hierarchy to locate data stored in the data storage system;

storing in each of a multiplicity of network interfaces of the data storage system the first data structure comprising a table of routing records mapping logical addresses for the partitions to caches of the data storage system;

storing in each cache the second data structure, comprising, within a given cache, a hash table mapping a logical address to a most-recent partition descriptor record (PDR) associated with a most-recent-version of a given partition in the logical volume, the most-recent PDR being comprised in partition descriptor records (PDRs), located in the given cache, having respective PDR-timestamps;

storing in each cache, for each most-recent PDR, an instance of the third data structure, comprising:

a doubly-linked list forward-linking and backward-linking the PDRs in response to the PDR-timestamps, and, for respective data associated with the PDRs, respective physical addresses in a non-volatile storage device of the data storage system of the respective data;

receiving a write command to write updated data to the given partition;

in response to the write command, traversing the first data structure to determine an appropriate cache, traversing therein the second data structure to determine if a prior PDR exists, and creating the most-recent PDR having a most-recent timestamp therein;

if the prior PDR for the given partition exists, updating the list to forward-link the prior PDR to the most-recent PDR and to backward-link the most-recent PDR to the prior PDR, and to incorporate a new physical address for the updated data;

writing the updated data to the new physical address;

updating the hash table of the second data structure in response to the most-recent PDR;

receiving a read command to read specific data at a specific logical address of the given partition current at a requested time; and in response to the read request performing the following steps in sequence:

using the first data structure to locate the appropriate cache, using the hash table of the second data structure comprised in the appropriate cache to access the most-recent PDR, and accessing the third data structure to read the most-recent timestamp of the most-recent PDR, and if the requested time is greater than the most-recent timestamp, reading the updated data from the new physical address, and if the requested time is less than the most-recent timestamp, iteratively traversing the list to determine a particular prior PDR having a timestamp closest to, and less than, the requested time, and reading the data associated with the particular prior PDR.

2. The method according to claim 1, and comprising linking the PDRs to each other by a binary tree responsively to writing the data stored in the data storage system.

3. The method according to claim 2, wherein the binary tree is generated by an Adelson-Velskii and Landis (AVL) method.

4. The method according to claim 1, wherein the PDRs comprise respective bitmap fields and wherein writing the updated data comprises using the bitmap fields to determine that the write command does not comprise a split write command.

5. The method according to claim 1, wherein the hash table comprises pointers associating the given partition with respective PDRs.

6. The method according to claim 1, wherein the equal sizes of the partitions are set in response to sizes of the data of the write command.

7. The method according to claim 1, wherein none of the data stored in the data storage system is overwritten.

* * * * *